United States Patent Office 2,902,388
Patented Sept. 1, 1959

2,902,388

HYDRAULIC CEMENT-POLYURETHANE COMPOSITIONS USEFUL FOR COATING, SEALING, PATCHING, AND SURFACING

Waclaw Szukiewicz, Snyder, N.Y., assignor to Allied Chemical Corporation, a corporation of New York No Drawing. Application June 27, 1957
Serial No. 668,305

15 Claims. (Cl. 117—70)

This invention relates to new coating, sealing, surfacing and patching compositions and to methods of applying such compositions.

In my application Serial No. 668,304, filed June 27, 1957, entitled "Process for Bonding Freshly Applied Hydraulic Cement Materials to Surfaces," is described a method for bonding fresh hydraulic cement material to an old cement surface involving the use of an adduct of a polyol with an organic polyisocyanate. The present application relates to compositions of matter comprising a mixture of hydraulic cement and the reaction product of an organic polyisocyanate and a polyol for coating, sealing, patching and surfacing.

An object of the present invention is to provide a hydraulic cement polyurethane resin composition which has unique and superior combination of properties which give it exceptional utility as a coating, sealing, patching and surfacing composition. Other objects and advantages will be apparent from the following description.

The compositions of this invention comprise a mixture of a hydraulic cement with an adduct of a polyol selected from the group consisting of glyceride esters of hydroxylated fatty acids, polyester-polyols and polyalkylene glycols and an organic polyisocyanate, preferably an arylene diisocyanate, which adduct is prepared by reacting a polyol having a molecular weight in the range of 300 to 2,300 with an amount of organic polyisocyanate sufficient to provide from 1.8 to 4.0, preferably 2.0 to 3.0, isocyanate groups for each hydroxyl group in the polyol, said hydraulic cement and adduct being in the proportion of 0.1 to 10 parts by weight, preferably 2 to 6 parts by weight, of hydraulic cement per part by weight of adduct.

The process of utilizing the compositions of this invention involves forming a mixture of hydraulic cement, prepolymer (adduct), an organic solvent thinner which is both volatile and unreactive, and a catalyst, applying the resulting paste to the surfaces which are to be coated or which define the spaces to be filled, and allowing the solvent-thinner to evaporate and the residual formulation to polymerize and cure at ambient or elevated temperatures. Preferably the "prepolymer" is formed prior to making the mixture but alternatively the "prepolymer"-forming polyol and polyisocyanate reactants may be incorporated into the mixture as such and allowed to react and form the prepolymer therein. In the event the prepolymer is separately formed prior to making the mixture, the catalyst should not be added until the mixture is ready to use. If the "prepolymer"-forming reactants are incorporated into the mixture as such, the catalyst may be added at a somewhat earlier time.

The compositions of this invention are characterized by an unusual combination of desirable properties which in many cases make possible results not obtainable by comparable or competitive means known to the prior art. Important uses of compositions of this invention include the following:

(1) Preparation of protective coatings, particularly for metal surfaces, which have good flexibility, toughness and resistance to impact, characteristic of polyurethane coatings prepared from unfilled prepolymer, combined with greatly improved hardness, adhesion, thickness (obtained in one application), hiding power, uniformity (freedom from bubbles), heat-stability, and resistance to water, water vapor and steam, aqueous alkali and various organic solvents.

(2) Preparation of seals for "bell and spigot" pipe couplings and the like, which seals resist vibrational stress far better than do prior art seals.

(3) Patching and/or resurfacing cracked and/or eroded concrete floors, pavements, walls and structures.

(4) Resetting and embedding loose fixtures (bolts, piping, cement nails, brackets, hangers, door stops, etc.) in concrete.

(5) Providing vibration-resistant foundation surfaces for supporting heavy machinery.

Hydraulic cements suitable for making the compositions of this invention include Portland cement, calcium aluminate cement and magnesia or magnesium oxychloride cement. Other fillers such as silica, bentonite, etc. do not yield compositions having the advantageous combination of properties characterizing the compositions containing hydraulic cement filler.

The polyols suitable for making the prepolymer component of the compositions of this invention should have molecular weights between 300 and 2,300. Compositions prepared from polyols having molecular weights below 300 are too brittle. "Prepolymers" prepared from polyols having molecular weights above 2,300 are viscous or solid, difficult to disperse, dissolve or "thin" and tend to gel rapidly. The polyols may contain functional groups, other than hydroxyl groups, which are capable of reacting with isocyanate groups, e.g. carboxyl groups, mercapto groups, primary or secondary amino groups, urethane linkages (which contain reactive hydrogen bonded to nitrogen) etc. However, the reactive hydrogen bearing groups in the polyol should be predominantly hydroxyl groups. Suitable polyols include the following:

(1) Castor oil and other glyceride esters of hydroxylated fatty acids. Castor oil is the preferred polyol. Related materials which are operative include hydrogenated castor oil, glycerine monoricinoleate, glycerine diricinoleate, and the blown drying oils, also referred to "heavy bodied" oils, such as blown soya, tung, poppyseed, hemp seed, or linseed oils, and partial esters of glycerine with "blown" drying oil fatty acids.

(2) Polyester-polyols prepared by copolymerizing low molecular weight polyols and polycarboxylic acids. These materials are prepared by reacting a mixture containing the polycarboxylic acids and polyols in proportions such that a stoichiometric excess of polyol is present to insure that the resulting polyester will have a preponderance of terminal hydroxyl groups over terminal carboxyl groups. Preferably the low molecular weight polyols are predominantly diols, e.g. mono-, di-, or triethylene or propylene glycols, 1,4-butanediol, diethanolamine, etc. Advantageously a minor amount of a triol such as glycerine, hexane triol, trimethylol ethane or trimethylol propane may be included. Suitable acids include adipic, succinic, maleic, phthalic, terephthalic, etc.

(3) Polyalkylene glycols such as polyethylene glycols, polypropylene glycols, or mixed polyethylene-polypropylene glycols having molecular weights between 300 and 2,300.

Polyisocyanates suitable for mixing the prepolymer include, among many other, 2,4- and 2,6-tolylene diisocyanates, diphenylmethane-4,4'-diisocyanate, para and meta phenylene diisocyanate, hexamethylene diisocyanate, 3,3-bitolylene-4,4'-diisocyanate, and 1,5-naphthalene diisocyanate.

The prepolymers are preferably prepared by heating a mixture of the polyol and polyisocyanate to 50-70° C. in an atmosphere of inert gas such as dry nitrogen. It is also possible to prepare them by mixing the polyol and polyisocyanate reactants with the thinner, hydraulic cement filler and catalyst, which catalyst will then catalyze the prepolymer-forming reaction as well as the subsequent polyurethane resin-forming reactions. In this method, due care must be taken to avoid harmful physiological effects of free isocyanate, if it is appreciably volatile.

Solvents and thinners should be volatile, water-free and should not contain reactive hydrogen. Suitable examples include solvent naphthas, turpentine, benzene, toluene, acetone, methylene chloride, ethyl acetate, etc.

Catalysts capable of accelerating the resin-forming reactions are, in general, bases. Weaker bases such as tertiary amines are preferred because stronger bases are too active. Examples are N-methyl morpholine, adipic acid diester of diethylaminoethanol, diethyl cyclohexylamine, 3-methyl isoquinoline, etc.

Some prepolymers, particularly those from high molecular weight polyester polyols, are prone to gel upon standing. This can be prevented by addition of a small amount of certain mineral acids or material reactive to liberate same, e.g. acyl halides such as acetyl chloride, benzoyl chloride, etc.

The nature of the resin forming reactions is not known with certainty. Reactions believed to be involved include addition reactions between isocyanate groups to yield uretidinedione linkages and addition reactions between isocyanate groups and urethane linkages to form substituted allophanic ester linkages.

The amount of hydraulic cement filler to be used will vary according to the prepolymer base and the purpose of the composition. As much as 6 parts or more of hydraulic cement may be incorporated readily into one part of certain prepolymer compositions such as the castor-oil-diphenyl methane 4,4'-diisocyanate adduct referred to in Example 1; in general, useful compositions may be obtained by using from 0.1 to 10 parts of hydraulic cement per part of "prepolymer" adduct. The hydraulic cement should be milled prior to use to break up lumps into unit particles.

Properties conferred on polyurethane resins by hydraulic cement fillers differ from those obtained with other fillers and appear to involve some type of interaction between the hydraulic cement and polyurethane which is as yet not understood.

The following examples illustrate the present invention.

EXAMPLE 1

*Preparation of prepolymer from castor oil and diphenylmethane-4,4'-diisocyanate*

The castor oil used in this example ("DB oil" marketed by Baker Castor Oil Co.) had a low moisture content, an acid value of about 1, and a composition equivalent to about 90% glycerine triricinoleate.

The diphenylmethane-4,4'-diisocyanate used was 99.4% pure and had a solidification point of 37.2° C.

The diisocyanate (470 parts=3.36 mol equivalents) was melted and heated to 50° C. under an atmosphere of dry nitrogen gas in a closed vessel provided with an agitator and external heating and cooling means. Castor oil (579 parts equivalent to 521 parts or 1.0 mol equivalents of glycerine triricinoleate) was added slowly. After the temperature rose to 65-70° C. from heat of reaction it was held thereat by cooling. The batch was agitated at 65-70° C. for one hour after addition of the castor oil was completed, cooled to 50° C., and packed out into containers lined with polyethylene.

The product had a calculated composition corresponding to 89.5% adduct of glycerine triricinoleate (1 mol) and diphenylmethane-4,4'-diisocyanate (3 mols); 4.8% excess diphenylmethane-4,4'-diisocyanate; and 5.5% other materials (principally glyceride of fatty acids other than ricinoleic acid).

EXAMPLE 2

*Use of prepolymer-cement composition for protective coatings*

The compositions of this invention may be used to obtain protective coatings characterized by an unusual combination of desirable properties as illustrated in this example. The coatings are easily applied by conventional brushing or dipping techniques; they may be applied by spraying if sufficient thinner is used.

Steel strips were coated (by brushing) with a fluid paste having the following composition: 300 parts Portland cement (milled prior to use to break up lumps), 100 parts of the prepolymer described above in Example 1, 100 parts of methylene chloride, and 1 part of N-methyl morpholine catalyst, which was added immediately prior to use. The coated strips were allowed to dry for one hour at room temperature and were then cured for 1 hour at 50° C. and 3 hours at 160° C. A uniform, strongly adherent coating of about 10 mils thickness was obtained. It was hard, tough, resistant to impact, and surprisingly flexible as evidenced by the fact that the strips could be bent through an angle of 90° without cracking the coating. The hardness was 7H to 8H as determined by the pencil hardness test. The coating had good resistance to temperatures up to 250° C. and to the chemical effects of water, acetone, aromatic solvents, dilute alkalies and dilute acids; in all these respects except resistance to dilute acids it was superior to coatings prepared from the unfilled prepolymer by comparable means.

Coatings of this type are excellent primer coats because of their good adhesion and resistance to water vapor.

Some of these coated strips were further coated with a clear solution consisting of 100 parts of the prepolymer, 100 parts of toluene and one part of N-methyl morpholine catalyst, which was added immediately prior to use. After drying and curing a coating of improved finish and resistance to acid were obtained. Other properties were not much affected except that the resistance to certain organic solvents such as acetone was lowered.

EXAMPLE 3

*Use of cement-prepolymer composition for sealing pipe joints*

The compositions of this invention have proven outstandingly successful for sealing pipe joints, such as the familiar "bell and spigot" joints of soil and sewer pipe. The material of pipe construction (cast-iron, "Duriron," "Transite," glazed tile, etc.) is not critical. The seals have held up under prolonged and extensive vibrational stress from traffic and heavy machinery operation under service conditions which caused frequent and repeated failures of seals made by the conventional prior art technique using oakum and molten lead.

A typical seal was prepared as follows: The members of the joint were cleaned and dried. The male member was wound with oakum which had been impregnated with a clear solution consisting of 100 parts of the prepolymer described in Example 1, supra, 50 parts of toluene, 50 parts of petroleum ether, and 1 part of N-methyl morpholine catalyst which was added immediately prior to use. The members of the joint were then apposed in coupling position. The impregnated oakum was worked into the bottom of the bell. The annular space between the "bell" and "spigot" was then filled with a sealing composition consisting of a mixture of 300 parts of Portland cement, 100 parts of the prepolymer described supra in Example 1, 50 parts of toluene, 50 parts of petroleum ether, and 1 part of N-methyl morpholine catalyst which was added immediately prior to use. The seal was allowed to cure at ambient temperature for 24 hours before the pipe was used to convey water.

EXAMPLE 4

*Use of cement-prepolymer composition for patching and resurfacing concrete*

Cracked and eroded concrete floors, walls and the like have been patched and resurfaced with the compositions of this invention to give excellent results. The present representative example relates to a concrete floor having deep cracks and a badly eroded surface which was washed out to the gravel by the action of acids and water. The erosion was not deep enough, however, to hold a new concrete layer.

The surface was cleaned to remove dust and grease and allowed to dry. The eroded areas were filled with a mixture prepared from 600 parts of Portland cement, 100 parts of the prepolymer described in Example 1, supra, 150 parts of toluene and 1 part of N-methyl morpholine catalyst which was added immediately prior to use. The cracks were dried and then filled with the same mixture except that more thinner (toluene) was used to permit deep penetration. The surface was smoothed in conventional manner. It was dry after 3 hours, and tack-free after 5 hours. For complete curing about 24 to 48 hours are required. The surface was durable, resistant, and pleasing in appearance, and smooth without being slippery. It was bonded to the old concrete with a bond strength greater than the cohesive tensile strength of concrete.

The compositions of this invention are particularly well suited to making foundation surfaces for machinery which vibrates when operating.

EXAMPLE 5

*Effect of cement filler on the properties of coatings prepared from "prepolymer" reaction products of castor oil and diphenylmethane-4,4'-diisocyanate*

The following data show the properties of brushed coatings prepared from the following compositions:

A. 100 parts of toluene and 100 parts of castor oil-diphenylmethane-4,4' diisocyanate adduct prepared as described in Example 1.

B. 100 parts of Composition A mixed with 300 parts of Portland cement.

C. 100 parts of Composition A mixed with 150 parts of Portland cement.

The coatings were applied to black iron strips, or inner surfaces of iron tubes except where otherwise specified, by the technique described in Example 2, supra.

(a) Economy: Inclusion of the inexpensive cement filler reduces the cost of the coatings, dry weight basis, by about 85% in the case of Coating B and about 75% in the case of Coating C.

(b) Thickness and hiding power: Coatings applied by a single brushing were about 12 mils thick in the case of Coating B but only about 3 mils thick in the case of Coating A. The hiding power of Coating B was superior to that of Coating A to a like degree.

(c) Drying time: The "dry thru" drying time, made at 30% relative humidity by the well known finger application test, was about 26 hours for Coating A and 6 hours for Coating B.

(d) Bubble formation: Coatings prepared from formulation A often contained bubbles resulting from the in situ evolution of carbon dioxide gas resulting from reaction of isocyanate groups with water and/or carboxyl groups present in the formulation materials. Coatings prepared from formulations B and C were consistently bubble-free under comparable conditions.

(e) Hardness, flexibility, resistance to impact: Addition to the cement-filler greatly increased the hardness of the coatings. The hardness as measured by the "scratch pencil" test was <HB for Coating A and 8H to 9H for Coatings B and C. This gain in hardness was obtained without significant impairment of resistance to impact, which was good for all the coatings; the flexibility, although reduced, remained satisfactory.

(f) Resistance to temperature: Coatings prepared from Compositions B and C resisted temperatures up to 250° C. for indefinite periods whereas coatings prepared from Composition A failed at temperatures above 210° C.

(g) Adhesion: Coatings prepared from Compositions B and C were often more adherent to various surfaces, including black iron, steel and glass, than coatings prepared from Composition A.

(h) Resistance to boiling water: Coated black iron strips made from Compositions A and B were immersed in boiling water and tested periodically to determine the adhesion of coating. A coating was adjudged to have failed when it could be rubbed off by finger action. Coating A failed after 44 hours whereas Coating B did not fail after 800 hours.

(i) Resistance to chemicals and organic solvents: Coated black iron strips made from Compositions A and B were immersed in acetone, dichlorobenzene, concentrated aqueous ammonia and 30% $H_2SO_4$ and tested periodically to determine adhesion of the Coating. In the acetone solution, Coating A failed after 20 days whereas Coating B did not fail after 150 days. In the dichlorobenzene solution, Coating A failed after 50 days whereas Coating B did not fail after 150 days. In the concentrated ammonia solution, Coating A failed after 90 days whereas Coating B did not fail after 150 days. In the 30% $H_2SO_4$ solution, Coating B failed after 24 days, whereas Coating A did not.

If it is desired to obtain the other advantages of cement-filled coatings without impaired resistance to the action of aqueous acids, a filled coating such as Coating B is first applied and an unfilled coating such as Coating A is then applied as a finish coat.

EXAMPLE 6

*Effect of the polyisocyanate base on the properties of coatings prepared from cement-filled compositions*

Table I sets forth data on the composition and properties of cement-filled coatings prepared from four different polyisocyanate bases, three of which are "prepolymer" type adducts of polyols and diisocyanates and one of which is a hydrocarbon polyisocyanate which does not contain any internal urethane linkages or the like.

Polyisocyanate base No. 1 is the adduct of castor oil and diphenylmethane-4,4'-diisocyanate described in Example 1, supra. The molecular weight of the polyol (glycerine triricinoleate) was 932 and that of the adduct was about 1684.

Polyisocyanate base No. 2 is a prepolymer prepared by reacting one mol of a polypropylene glycol having an average molecular weight of about 1025 with 2.2 mols of diphenylmethane-4,4'-diisocyanate in a manner similar to that described in Example 1, supra. The molecular weight of the adduct was about 1726.

Polyisocyanate base No. 3 is a prepolymer prepared by reacting 3.3 mols of a mixture of 80 parts of 2,4-tolylene diisocyanate and 20 parts of 2,6-tolylene diisocyanate with one mol of 1,2,6-hexanetriol (molecular weight 134) in a manner similar to that described in Example 1 except that the tolylene diisocyanate mixture was a liquid which did not need to be melted. The molecular weight of the adduct was about 675.

Polyisocyanate base No. 4 is a mixture of polyisocyanates having the structure

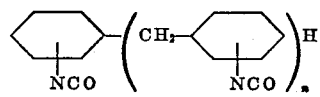

where $n$ has an average value slightly higher than 2, which was prepared by phosgenating a mixture of polyformanilines of corresponding structure by methods similar to those described in Examples 1 and 2 of U.S.P. 2,683,730. This material had an average molecular weight of about 400.

The polyisocyanate base, toluene, and Portland cement were mixed to form a fluid paste, which was applied by brushing or (in most instances) by dipping. The catalyst was added to the paste immediately prior to use.

TABLE I.—COMPOSITION AND PROPERTIES OF CEMENT-FILLED COATINGS PREPARED FROM VARIOUS POLYISOCYANATES

| Polyisocyanate Base, No. | 1 | 2 | 3 | 4 |
|---|---|---|---|---|
| Parts base | 100 | 100 | 100 | 100. |
| Parts toluene | 100 | 100 | 100 | 100. |
| Parts Portland cement | 300 | 300 | 300 | 300. |
| Parts catalyst (N-methyl morpholine) | 1 | 1 | 1 | 1. |
| Ease of mixing | Good | Excellent | Good | Good. |
| Brushability and dippability | do | Very good | V. poor; sets too fast. | V. poor; sets too fast. |
| Flexibility and resistance to impact | do | Excellent | Brittle; chips off. | Brittle; chips off. |
| Pencil hardness | 8H to 9H | >HB | 8H | 9H. |
| Surface | Smooth | Smooth | Rough | Rough. |
| Adhesion to steel | Excellent | Fair | Good | Good. |
| Adhesion to glass | do | Good | Poor | Fair. |

The data of Table I show that coatings prepared from polyisocyanate base No. 1 are best as to hardness and adhesion and good as to flexibility and resistance to impact. This coating possesses a unique combination of advantageous properties which makes it eminently suitable for a variety of uses and preferable for most of them.

Coatings prepared from polyisocyanate base No. 2 are best as to flexibility, but are considerably less hard than coatings prepared from polyisocyanate base No. 1 and somewhat inferior as to adhesion. This coating is suitable for uses where good flexibility is desirable and superior hardness is not essential.

Coatings prepared from polyisocyanate bases Nos. 3 and 4 are unsatisfactory primarily because they are too brittle, chip easily, and have poor resistance to impact. Also the formulation materials are too reactive and can not be brushed or dipped easily because of rapid formation of resinous materials after addition of the catalyst.

Although certain preferred embodiments of the invention have been disclosed for purpose of illustration, it will be evident that various changes and modifications may be made therein without departing from the scope and spirit of the invention.

I claim:

1. A composition adapted for coating, sealing, patching and surfacing comprising a mixture of a hydraulic cement with an adduct prepared by reacting a glyceride ester of a hydroxylated fatty acid having a molecular weight in the range of 300–2,300 with an amount of organic polyisocyanate sufficient to provide from 2.0 to 3.0 isocyanate groups for each hydroxyl group in the glyceride ester of a hydroxylated fatty acid, said hydraulic cement and adduct being in the proportion of 2 to 6 parts by weight of hydraulic cement per part by weight of adduct, a resin-forming catalyst and an organic solvent which is volatile, water-free and unreactive.

2. A composition adapted for coating, sealing, patching and surfacing comprising a mixture of a hydraulic cement with an adduct prepared by reacting a polyester-polyol having a molecular weight in the range of 300–2,300 with an amount of organic polyisocyanate sufficient to provide from 2.0 to 3.0 isocyanate groups for each hydroxyl group in the polyester-polyol, said hydraulic cement and adduct being in the proportion of 2 to 6 parts by weight of hydraulic cement per part by weight of adduct, a resin-forming catalyst and an organic solvent which is volatile, water-free and unreactive.

3. A composition adapted for coating, sealing, patching and surfacing comprising a mixture of a hydraulic cement with an adduct prepared by reacting a polyalkylene glycol having a molecular weight in the range of 300–2,300 with an amount of organic polyisocyanate sufficient to provide from 2.0 to 3.0 isocyanate groups for each hydroxyl group in the polyalkylene glycol, said hydraulic cement and adduct being in the proportion of 2 to 6 parts by weight of hydraulic cement per part by weight of adduct, a resin-forming catalyst and an organic solvent which is volatile, water-free and unreactive.

4. A composition adapted for coating, sealing, patching and surfacing comprising a mixture of Portland cement with an adduct prepared by reacting castor oil with an amount of diphenylmethane-4,4'-diisocyanate sufficient to provide from 2.0 to 3.0 isocyanate groups for each hydroxyl group in the castor oil, said Portland cement and adduct being in the proportion of 2 to 6 parts by weight of Portland cement per part by weight of adduct, a resin-forming catalyst and an organic solvent which is volatile, water-free and unreactive.

5. A composition adapted for coating, sealing, patching and surfacing comprising a mixture of a hydraulic cement with an adduct prepared by reacting a polyol having a molecular weight in the range of 300–2,300 with an amount of organic polyisocyanate sufficient to provide from 1.8 to 4.0 isocyanate groups for each hydroxyl group in the polyol, said hydraulic cement and adduct being in the proportion of 0.1 to 10 parts by weight of hydraulic cement per part by weight of adduct, a resin-forming catalyst and an organic solvent which is volatile, water-free and unreactive.

6. A composition adapted for coating, sealing, patching and surfacing comprising a mixture of a hydraulic cement with an adduct prepared by reacting a glyceride ester of a hydroxylated fatty acid having a molecular weight in the range of 300–2,300 with an amount of organic polyisocyanate sufficient to provide from 2.0 to 3.0 isocyanate groups for each hydroxyl group in the glyceride ester of a hydroxylated fatty acid, said hydraulic cement and adduct being in the proportion of 2 to 6 parts by weight of hydraulic cement per part by weight of adduct, a tertiary amine as a resin-forming catalyst and an organic solvent which is volatile, water-free and unreactive.

7. A composition adapted for coating, sealing, patching and surfacing comprising a mixture of a hydraulic cement with an adduct prepared by reacting a polyester-polyol having a molecular weight in the range of 300–2,300 with an amount of organic polyisocyanate sufficient to provide from 2.0 to 3.0 isocyanate groups for each hydroxyl group in the polyester-polyol, said hydraulic cement and adduct being in the proportion of 2 to 6 parts by weight of hydraulic cement per part by weight of adduct, a tertiary amine as a resin-forming catalyst and an organic solvent which is volatile, water-free and unreactive.

8. A composition adapted for coating, sealing, patching and surfacing comprising a mixture of a hydraulic cement with an adduct prepared by reacting a polyalkylene glycol having a molecular weight in the range of 300–2,300 with an amount of organic polyisocyanate sufficient to provide from 2.0 to 3.0 isocyanate groups for each hydroxyl group in the polyalkylene glycol, said hydraulic cement and adduct being in the proportion of 2 to 6 parts by weight of hydraulic cement per part by weight of adduct, a tertiary amine as a resin-forming catalyst and an organic solvent which is volatile, water-free and unreactive.

9. A composition adapted for coating, sealing, patching and surfacing comprising a mixture of Portland cement with an adduct prepared by reacting castor oil with an amount of diphenylmethane-4,4'-diisocyanate sufficient to provide from 2.0 to 3.0 isocyanate groups for each hydroxyl group in the castor oil, said Portland cement and adduct being in the proportion of 2 to 6 parts by weight of Portland cement per part by weight of adduct, a tertiary amine as a resin-forming catalyst and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst.

10. A method of bonding hydraulic cement-polyurethane resin composition to a surface which comprises applying a mixture of a hydraulic cement with an adduct prepared by reacting a polyol having a molecular weight in the range of 300–2,300 with an amount of organic polyisocyanate sufficient to provide from 1.8 to 4.0 isocyanate groups for each hydroxyl group in the polyol, said hydraulic cement and adduct being in the proportion of 0.1 to 10 parts by weight of hydraulic cement per part by weight of adduct, a resin-forming catalyst and an organic solvent which is volatile, water-free and unreactive, evaporating the solvent and curing the applied mixture.

11. In a method as claimed in claim 10 the further step of applying to the filled coating an unfilled coating comprising an adduct prepared by reacting a polyol having a molecular weight in the range of 300–2,300 with an amount of organic polyisocyanate sufficient to provide from 1.8 to 4.0 isocyanate groups for each hydroxyl group in the polyol, a resin-forming catalyst and an organic solvent which is volatile, water-free and unreactive.

12. A method of bonding hydraulic cement-polyurethane resin composition to a surface which comprises applying a mixture of a hydraulic cement with an adduct prepared by reacting a glyceride ester of a hydroxylated fatty acid having a molecular weight in the range of 300–2,300 with an amount of organic polyisocyanate sufficient to provide from 2.0 to 3.0 isocyanate groups for each hydroxyl group in the glyceride ester of a hydroxylated fatty acid, said hydraulic cement and adduct being in the proportion of 2 to 6 parts by weight of adduct, a tertiary amine as a resin-forming catalyst and an organic solvent which is volatile, water-free and unreactive, evaporating the solvent and curing the applied mixture.

13. A method of bonding hydraulic cement-polyurethane resin composition to a surface which comprises applying a mixture of a hydraulic cement with an adduct prepared by reacting a polyester-polyol having a molecular weight in the range of 300–2,300 with an amount of organic polyisocyanate sufficient to provide from 2.0 to 3.0 isocyanate groups for each hydroxyl group in the polyesterpolyol, said hydraulic cement and adduct being in the proportion of 2 to 6 parts by weight of hydraulic cement per part by weight of adduct, a tertiary amine as a resin-forming catalyst and an organic solvent which is volatile, water-free and unreactive, evaporating the solvent and curing the applied mixture.

14. A method of bonding hydraulic cement-polyurethane resin composition to a surface which comprises applying a mixture of a hydraulic cement with an adduct prepared by reacting a polyalkylene glycol having a molecular weight in the range of 300–2,300 with an amount of organic polyisocyanate sufficient to provide from 2.0 to 3.0 isocyanate groups for each hydroxyl group in the polyalkylene glycol, said hydraulic cement and adduct being in the proportion of 2 to 6 parts by weight of hydraulic cement per part by weight of adduct, a tertiary amine as a resin-forming catalyst and an organic solvent which is volatile, water-free and unreactive, evaporating the solvent and curing the applied mixture.

15. A method of bonding hydraulic cement-polyurethane resin composition to a surface which comprises applying a mixture of Portland cement with an adduct prepared by reacting castor oil with an amount of diphenylmethane-4,4'-diisocyanate sufficient to provide from 2.0 to 3.0 isocyanate groups for each hydroxyl group in the castor oil, said Portland cement and adduct being in the proportion of 2 to 6 parts by weight of Portland cement per part by weight of adduct, a tertiary amine as a resin-forming catalyst and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst, evaporating the solvent and curing the applied mixture.

References Cited in the file of this patent

UNITED STATES PATENTS

| | | |
|---|---|---|
| 2,311,233 | Jaenicke et al. | Feb. 16, 1943 |
| 2,491,487 | Faulwetter | Dec. 20, 1949 |
| 2,650,212 | Windemuth | Aug. 25, 1953 |
| 2,672,793 | Rowe | Mar. 23, 1954 |
| 2,798,822 | Carter | July 9, 1957 |

FOREIGN PATENTS

| | | |
|---|---|---|
| 167,675 | Australia | May 14, 1956 |

OTHER REFERENCES

Pinner Plastics, May 1947, pages 257 to 262 (page 258 relied on).

Monsanto (1) Isocyanates, Tech. Bulletin, P–125, October 1, 1951, Phosphate Division, St. Louis 4, Missouri (page 6 relied on).

Stevenson: Rubber Age, volume 77, No. 1, April 1955 (page 64 relied on).